United States Patent [19]
Freed et al.

[11] Patent Number: 5,660,126
[45] Date of Patent: Aug. 26, 1997

[54] METHOD AND APPARATUS FOR NO-TILL PLANTING

[75] Inventors: Brian E. Freed, Lexington; David E. Freed, Towanda; John T. Schneider, Normal, all of Ill.

[73] Assignee: Agricommunication and Technology, Inc., Bloomington, Ill.

[21] Appl. No.: 405,899

[22] Filed: Mar. 17, 1995

Related U.S. Application Data

[63] Continuation-in-part of Ser. No. 183,697, Jan. 19, 1994, Pat. No. 5,413,056.

[51] Int. Cl.$^6$ ............................................. A01C 5/00
[52] U.S. Cl. ........................... 111/140; 111/139; 111/900; 111/924
[58] Field of Search ....................... 111/141, 140, 111/147, 924, 900, 139; 172/29

[56] References Cited

U.S. PATENT DOCUMENTS

| | | |
|---|---|---|
| 375,081 | 12/1887 | Lynch. |
| 842,066 | 1/1907 | Beymer ................. 111/141 X |
| 1,311,427 | 7/1919 | Tulloss. |
| 1,371,012 | 3/1921 | Williams. |
| 1,857,749 | 5/1932 | White. |
| 2,222,015 | 11/1940 | Bateman. |
| 2,734,439 | 2/1956 | Padrick. |
| 3,372,657 | 3/1968 | Hansen. |
| 3,811,387 | 5/1974 | Meiners ................. 111/924 X |
| 4,404,918 | 9/1983 | Whalen et al.. |
| 4,574,715 | 3/1986 | Dietrich, Sr. et al.. |
| 4,596,199 | 6/1986 | Dietrich, Sr. et al.. |
| 4,723,495 | 2/1988 | Dietrich, Sr. et al.. |
| 4,762,181 | 8/1988 | Cox. |
| 4,785,890 | 11/1988 | Martin. |
| 5,076,180 | 12/1991 | Schneider. |
| 5,129,282 | 7/1992 | Bassett et al.. |
| 5,279,236 | 1/1994 | Truax ................. 111/924 X |
| 5,349,911 | 9/1994 | Holst et al. ................. 111/139 |

OTHER PUBLICATIONS

"Cox" Row Zone —A Step Beyond, Cox, Inc. Advertisement, two pages, date unknown.
Mangold, "Beyond Higher Yields And Less Erosion, Enter The Row Zone", Soybean Digest, Feb. 1987, p. 47.
"They go underground for a better seedbed", Farm Journal, Mid–Mar. 1989, p. 18–P.
"Yetter... for land's sake!", Yetter Manufacturing Company catalog, Nov. 1992.
"Yetter No–Till Solutions", 1993–1994 The Yetter Catalog, Yetter Manufacturing Company.
Finch, "Field trails test planter attachments", Farm Journal, Mid–Jan. 1993, pp. 10–15.
Ernst, "Strip Preparation Could Heat Up The North", No–Till Farmer, Apr. 1993, pp. 8 and 9.
Mangold, "Fertilizer Strips Aid Corn Growth", Soybean Digest, Oct. 1993, pp. a and d.
Kinze, "2000 Series Planters" brochure, pp. 4 and 5, Jan. 1995.
Ausherman GP, "Terra–Tine row cleaner", one page, date unknown.
KMC, "Bedders" brochure, 4 pages, date unknown.
KMC, "Ripper Bedder Planter" brochure, 2 pages, date unknown.

Primary Examiner—Terry Lee Melius
Assistant Examiner—Christopher J. Novosad
Attorney, Agent, or Firm—Barnes & Thornburg

[57] ABSTRACT

A no-till farming apparatus is provided for use with a planter unit which plants seeds as the planter unit is pulled along a predetermined path. The apparatus includes a hiller device coupled to the planter unit. The hiller device is configured to form an elevated ridge including a mixture of soil and a residue remaining from a previous crop in front of the planter unit so that the planter unit plants seeds a predetermined distance below a top surface of the elevated ridge formed by the hiller device. The apparatus also includes a residue cleaning implement located in front of the hiller device to clear at least a portion of the residue in front of the hiller device. In the illustrated embodiment, the residue cleaning implement is pivotably coupled to a support extending in front of the hiller device.

26 Claims, 6 Drawing Sheets

METHOD AND APPARATUS FOR NO-TILL PLANTING

This application is a continuation-in-part of application Ser. No. 08/183,697 filed Jan. 19, 1994, now U.S. Pat. No. 5,413,056.

BACKGROUND AND SUMMARY OF THE INVENTION

The present invention relates to a method and apparatus for no-till planting. More particularly, the present invention relates to an improved no-till planter attachment configured to improve seed germination, to provide better plant vigor, and to establish a higher plant stand to promote early-season plant growth.

The goal of most farmers is to complete corn planting as early in the planting season as possible in order to maximize yield potential for corn. For many years, farmers relied upon deep tilling methods using a moldboard plow, a chisel plow, or other apparatus to cut deeply into the soil and bury any residue from a previously planted crop remaining after a harvest. After such primary deep tilling operation, a secondary tilling operation using a plurality of disks or sweeps are used to break up large clumps of tilled soil.

One problem associated with conventional deep tilling methods is the wear and tear on tractors used to pull the deep tilling apparatus. In addition, fuel costs for pulling deep tilling apparatus and for the required multiple passes over the same field are high. Conventional deep tilling methods also contribute to erosion of the cultivated fields by water run off and wind. This erosion problem was addressed in the 1985 farm bill which includes regulations for farming highly erodible land (HEL). Growers that farm HEL must be in compliance with the farm bill regulations by 1994. All farm plans with HEL must have at least 30% residue cover after planting each spring. Farmers must stay in compliance with the farm bill in order to maintain eligibility for USDA subsidy payments.

Over the past several years the concept of no-till or low-till farming has developed. In no-till or low-till farming, fields are not plowed or cultivated between crops. Attachments on the planter open a furrow, deposit seeds therein, and close the furrow in a single pass operation.

Several types of row cleaner devices have been developed to clean residue remaining from a previous crop from an area in front of each planter row as the planter unit is pulled through the field. See, for example, U.S. Pat. No. 4,785,890 to Martin; U.S. Pat. No. 5,076,180 to Schneider; and U.S. Pat. No. 5,129,282 to Bassett et al. These row cleaners typically include a pair of rotating wheels or brushes coupled to the planter unit in front of each row to move residue out of a planter row ahead of a planter unit.

The no-till planting apparatus of the present invention mixes the remaining residue with soil in an area ahead of each planted row. The mixing of soil and residue in the present invention is shallow mixing which occurs only in a confined area and which does not disturb the soil immediately under the planter unit. There is no need for deep primary or secondary tillage with the apparatus and method of the present invention.

The apparatus of the present invention uses a disk hiller or other suitable hiller device to build up about a 1 inch to about a 1½ inch deep elevated ridge above a top surface of the soil in front of the planter unit. The first and second blades o the disk hiller of the present invention are positioned at an angle relative to each other which is opposite from the angle of the wheels or brushes of the row cleaner devices discussed above so that the disk hiller forms the elevated ridge as the planter unit moves. The disks penetrate the soil on either side of the planted row area approximately ¾ inch deep and cut a 3–4 inch soil width.

The hiller device of the present invention is used in a very reduced or no-tillage farming operation which reduces fuel and labor costs by as much as 60–70% as compared to current practices. The elevated ridge formed by the disk hiller elevates the planter unit slightly above the top surface of the soil. This elevated ridge therefore allows the seeds to be planted at a normal depth by the planter unit, usually about 1 inch to about 2½ inches deep, but the seeds are raised up in the soil profile toward the top surface of the soil since the planter unit rides on the elevated ridge.

The apparatus of the present invention evenly mixes the soil and any remaining residue which can result in higher percent residue cover. The result is a more even residue cover than if it had been left as no-till. The row cleaner units concentrate on removing a portion of the residue in area between the planted rows. The disk mixing action of the hiller device of the present invention evenly blends the remaining crop residue and soil then places the mixture back in the area of origination. The result from the mixed soil and crop residue is a more even distribution of the residue.

One problem associated with conventional no-till farming methods is slow plant growth early in the season. Typical no-till attachments include a coulter mounted directly in front of each row of the planter. Such coulters can either cause "sidewall" compaction and/or create air pockets, both of which reduce seed germination and seedling growth, especially in cool, wet conditions which are normal during optimum planting dates.

Advantageously, the apparatus of the present invention can be used earlier in the planting season than conventional row cleaner devices. The double disk apparatus of the present invention requires only the top 1 inch to 1½ inches of the soil to be ready to plant. The soil dries and warms up from the top surface in a downward direction. Soil temperatures in the worked area are often a minimum of 6° F. higher per inch as you move upwardly in the soil profile. For example you could have a temperature at 2½ inches below the top surface of 48°, and a temperature 1 inch higher of about 54°. Such higher temperatures would enhance early season growth. In the present invention, the seeds are planted about 1 inch to about 1½ inches closer to the top of the "original" soil surface of the soil than conventional planting operations. Therefore, the seed planting position is higher in the soil profile, but still may be in an undisturbed or untilled soil profile. Seed placement underneath the elevated ridge is in a warmer and drier area than seeds planted at the typical deeper location in the soil profile. This improves the rate of seed germination and improves growth early in the season.

The soil in the ridged and upper soil surface is warmer, drier, and more friable than soil farther down in the soil profile. Soil that is more friable allows seeds to have good contact with the soil surrounding the whole seed. Partial attachment of the soil seed contact may result in lower germination and may cause the seed to dry out. This reduces seedling growth and vigor early in the season and often results in lower plant populations. Subsequently yields may be reduced at harvest. Friable soil at the surface allows the closing wheels at the back side of the planter to close off the furrow or slot and thereby prevent the soil below the slot area where the seed is planted from drying out.

The apparatus of the present invention also improves water drainage to keep the soil in the planted row moist, but not water logged. The firming action of the gauge wheel(s) of the planter moving over the elevated ridge is an important aspect of the present invention. Water soaks into the elevated ridge instead of eroding the soil away. Water is channeled down either side, but not to the extent that any substantial eroding occurs.

No-till farming increases earthworm population. Earthworms come up to the surface of the soil for feeding and build a small mound areas (midden) by pulling in residue and mixing it in with soil. The crop residue material is a food source and keeps the earthworm channel below open and the moisture high (relative humidity). One aspect of this is that the earthworm middens, surface mound of a earthworm channel, makes the surface area rough to plant crops. By running the double disk units in front of the row, the result would be a smooth area to operate the planter units and a more even distribution of crop residue over the soil surface.

The use of disk hillers in certain types of farm equipment is known. See, for example, U.S. Pat. No. 4,762,181 to Cox and U.S. Pat. No. 3,372,657 to Hansen. The Cox patent discloses a pull type implement which includes a coulter to cut residue and a deep chisel shank to till the soil deeply below the surface. Because of the deep soil shank, the Cox patent discloses a disk hiller located behind the shank to fill in the trenched area formed by the shank. The Cox patent uses a deep tillage operation, and the Cox patent is not concerned with minimizing or providing very little disturbance of the soil like the apparatus and method of the present invention. The Hansen patent also discloses a plow for providing deep tillage of the soil.

According to one aspect of the present invention, a no-till apparatus is provided for use with a planter unit which plants seeds as the planter unit is pulled along a predetermined path. The planter unit includes means for cutting a furrow at a predetermined depth and means for depositing seeds in the furrow. The apparatus includes means for forming an elevated ridge including a mixture of soil and residue remaining from a previous crop without cutting the soil at a depth greater the predetermined depth, and means for coupling the elevated ridge forming means directly to the planter unit so that the elevated ridge forming means forms the elevated ridge ahead of and aligned with the planter unit so that the planter unit plants seeds at substantially the predetermined depth below a top surface of the elevated ridge.

In the illustrated embodiment, the hiller device for forming an elevated ridge includes a disk hiller having a first blade and a second blade spaced apart from the first blade. The first blade and the second blade are aligned at an angle relative to each other to form the elevated ridge.

Also in the illustrated embodiment, the coupling means is configured to position a trailing edge of the first and second blades a predetermined distance ranging from about 4 inches to about 8 inches ahead of the planter unit. Preferably, the predetermined distance is about 6 inches.

Illustratively, a leading edge of the first blade of the disk hiller is spaced apart from a leading edge of the second blade by a distance ranging from about 8 inches to about 16 inches. A trailing edge of the first blade is spaced apart from a trailing edge of the second blade by a distance ranging from about 4 inches to about 8 inches. Preferably, the leading edge of the first blade is spaced apart from the leading edge of the second blade by a distance of about 13 inches, and the trailing edge of the first blade is spaced apart from the trailing edge of the second blade by a distance of about 6 inches. The first and second blades of the disk hiller are illustratively aligned at about a 15° angle relative to an axis of symmetry of the disk hiller.

The planter unit includes an opener for cutting a furrow or slot in the ground at a predetermined depth, means for depositing seeds in the furrow, and gauge wheel(s). The top surface of elevated ridge formed by the disk hiller is located about 1 inch to about 1½ inches above a top surface of the soil. The gauge wheel(s) of the planter unit ride on the elevated ridge formed by the disk hiller to provide a raised profile seeding depth for the planted seeds relative to a top surface of the soil. The first and second blades of the disk hiller cut into the top surface of the soil only to a depth less than said predetermined depth of the furrow or slot opening.

According to another aspect of the present invention, an improved no-till farming method is provided for preparing soil covered with a residue from a previous crop for planting seeds using a planter unit. The planter unit includes a double disk opener for cutting a furrow in the soil at a predetermined depth and means for depositing seeds in the furrow. The method includes the step of forming an elevated ridge including of a mixture of soil and residue ahead of the planter unit by cutting below a top surface of the soil at a depth less than said predetermined depth to mix soil and residue in front of the planter unit so that the planter unit plants seeds below a top surface of the elevated ridge to provide a raised profile seeding depth for the planted seeds relative to the top surface of the soil.

Another object of the present invention is to provide a no-till planting apparatus which partially removes residue from a row in front of a planter unit, and then forms an elevated ridge including a mixture of any remaining residue and soil so that the planted seeds are raised in the soil profile toward a top surface of the soil.

To accomplish this objective, another embodiment of the present invention provides a residue cleaning implement located ahead of a hiller device coupled to the planter unit. The residue cleaning implement preferably includes at least one rotating wheel, brush, or disk for at least partially removing the residue remaining from a previous crop. Such row cleaners are known and are discussed above. The hiller device preferably includes a disk hiller including at least one disk blade aligned at an angle to form the elevated ridge. The elevated ridge may be formed ahead of the planter unit so that at least one gauge wheel of the planter rides on the elevated ridge. In this instance, seeds are planted at a normal depth by the planter unit. In another embodiment, the seeds are planted at a more shallow depth than normal, and the hiller device is mounted after the seed is deposited to form the elevated ridge over the shallow planted seeds.

According to yet another aspect of the present invention, a no-till farming apparatus is provided for use with a planter unit which plants seeds as the planter unit is pulled along a predetermined path. The apparatus includes a hiller device coupled to the planter unit. The hiller device is configured to form an elevated ridge including a mixture of soil and a residue remaining from a previous crop in front of the planter unit so that the planter unit plants seeds a predetermined distance below a top surface of the elevated ridge formed by the hiller device. The apparatus also includes a residue cleaning implement coupled to the hiller device. The residue cleaning implement is located in front of the hiller device to clear at least a portion of the residue in front of the hiller device.

In the illustrated embodiment, the hiller device includes a first blade and a second blade spaced apart from the first blade. The first and second blades are aligned at an angle relative to each other to form the elevated ridge as discussed above. A fertilizer disk is preferably coupled to the hiller device to apply fertilizer during the planting operation.

The planter unit includes a disk opener for cutting a furrow in the ground at a predetermined depth, a seed delivery tube to deposit seeds in the furrow, and at least one gauge wheel. The at least one gauge wheel is configured to ride on the elevated ridge formed by the hiller device to provide a raised profile seeding depth for the planted seeds relative to a top surface of the soil. Preferably, the first and second blades of the hiller device cut into the top surface of the soil only to a depth less than said predetermined depth of the disk opener of the planter unit.

According to still another aspect of the present invention, a no-till farming apparatus is provided for use with a planter unit which plants seeds as the planter unit is pulled along a predetermined path. The apparatus includes a support rigidly coupled to the planter unit and extending ahead of the planter unit, and a residue cleaning implement pivotably coupled to the support to clear at least a portion of a residue remaining from a previous crop in front of the planter unit.

In the illustrated embodiment, a damper is coupled to the residue cleaning implement to limit pivotable movement of the residue cleaning implement relative to the support. The residue cleaning implement includes at least one wheel, brush, or disk rotatably coupled to a mounting bracket. The mounting bracket being pivotably coupled to the support. Preferably, the residue cleaning implement includes a pair of diverging wheels, brushes, or disks rotatably coupled to the mounting bracket.

In one illustrated embodiment, a hiller device is coupled to the support. The hiller device is located between the residue cleaning implement and the planter unit to form an elevated ridge including a mixture of soil and residue in front of the planter unit so that the planter unit plants seeds a predetermined distance below a top surface of the elevated ridge formed by the hiller device. In another illustrated embodiment, a hiller device is coupled to the planter unit on an opposite side of the planter unit from the residue cleaning implement. Therefore, the elevated ridge is formed over the seeds after the seeds are planted.

According to a further aspect of the present invention, an improved no-till farming method is provided for preparing soil covered with a residue remaining from a previous crop for planting seeds using a planter unit. The method includes the steps of clearing at least a portion of the residue ahead of the planter unit, and forming an elevated ridge from the at least partially cleared soil. The elevated ridge includes of a mixture of soil and the residue. The method also includes the steps of planting seeds below a top surface of the elevated ridge to provide a raised profile seeding depth for the planted seeds relative to a top surface of the soil. The clearing, forming, and planting steps all occur during a single pass of the planter unit over the soil.

In one illustrated method, the step of forming the elevated ridge occurs ahead of the planter unit. The planter unit includes a disk opener for cutting a furrow in the soil at a predetermined depth. The step of forming an elevated ridge includes the step of cutting below a top surface of the soil only to a depth less than said predetermined depth to mix soil and the residue in front of the planter unit.

The method further includes the step of applying fertilizer below the elevated ridge during the single pass of the planter unit over the soil. In another illustrated method, the step of forming the elevated ridge occurs after the planting step.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
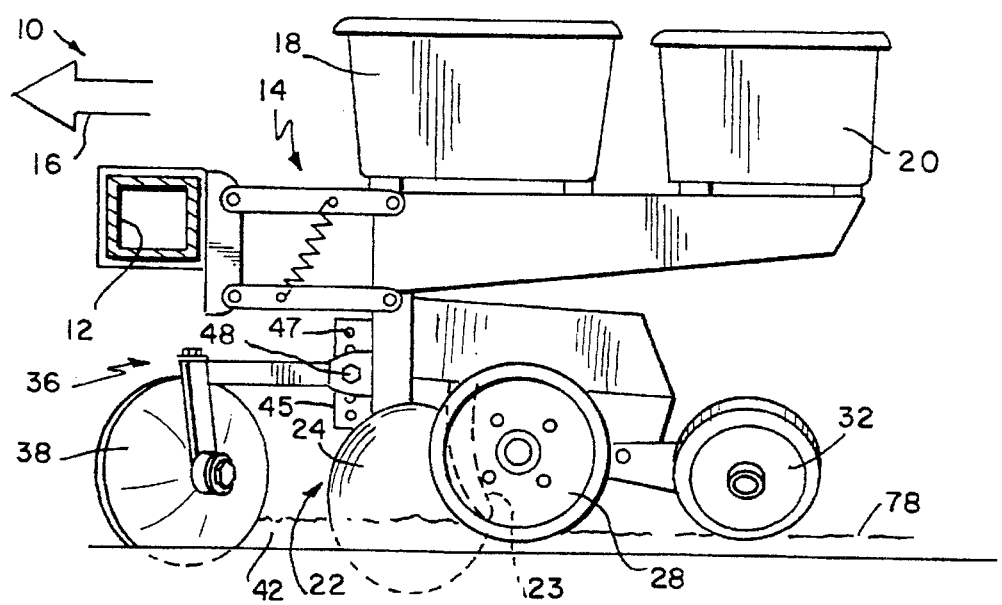
FIG. 1 is a side elevational view of a planter assembly of the present invention which includes a double disk hiller mounted in front of the planter unit.

Referring now to the drawings, FIG. 1 illustrates a conventional planter unit 10 which is mounted to a tool bar 12 by linkage 14. Planter unit 10 is pulled in the direction of arrow 16 by a tractor (not shown). The planter unit 10 includes a seed hopper 18 and a fertilizer hopper 20. Planter unit 10 also includes a double-disk opener 22 including first and second disk blades 24 and 26, respectively, for cutting a furrow in the soil for receiving seeds therein. A pair of laterally spaced apart gauge wheels 28 and 30 are located behind double-disk openers 22. Planter unit 10 also includes means, such as a seed delivery tube 23, for depositing seeds in the furrow formed by double disk opener 22. A pair of press wheels 32 and 34 are located behind gauge wheels 28 and 30, respectively. It is understood that double disk openers 22, gauge wheels 28 and 30, and press wheels 32 and 34 do not limit the present invention. Other arrangements of these elements may be provided for planting seeds in the soil. For instance, it is understood that the planter unit 10 may only include one disk opener for cutting the furrow. The planter unit 10 may also include a winged opener. It is also understood that a single gauge wheel may be used with the planter unit 10.

The apparatus of the present invention includes a hiller device such as a double disk hiller apparatus 36 coupled to planter unit 10. Double disk hiller 36 includes a pair of spaced apart disk blades 38 and 40 which are aligned at an angle relative to each other to form an elevated ridge 42 in line with a planter row as planter unit 10 is pulled in the direction of arrow 16. It is understood that a disk hiller 36 is coupled in front of each row of the planter.

Figure 2:
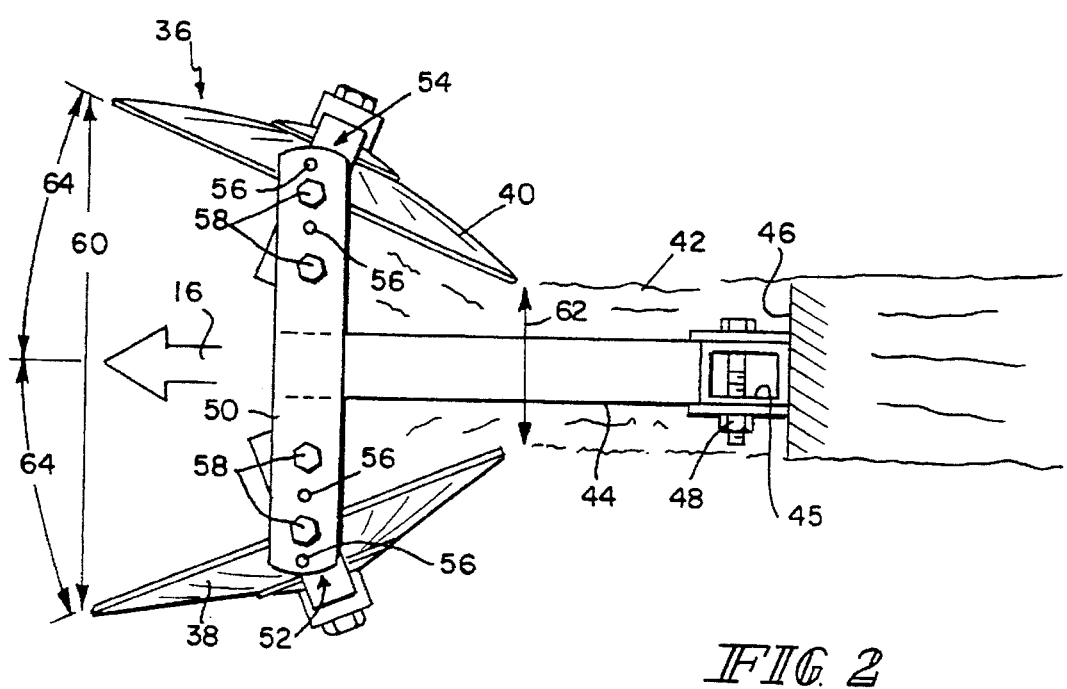
FIG. 2 is a top plan view of one embodiment of the double disk hiller of the presented invention.

One embodiment of the double-disk hiller 36 is illustrated in FIG. 2. In this embodiment, a square tube frame member 44 is coupled to a vertical mounting bracket 45 with a suitable fastener 48. Illustratively, mounting bracket 45 is a square tube having as a plurality of apertures 47 formed therein to permit the height of disk hiller 36 to be adjusted relative to planter unit 10. Mounting bracket 45 is welded or otherwise secured to a front wall 46 of planter unit 10. A T-frame 50 is coupled to frame member 44. Disk blades 38 and 40 are coupled to frame member 50 by spindle and arm assemblies 52 and 54, respectively. The angle of disk blades 38 and 40 relative to each other is adjustable using holes 56 and fasteners 58. Leading edges of disk blades 38 and 40 are spaced apart a first predetermined distance illustrated by dimension 60 in FIG. 2. Trailing edges of blades 38 and 40 are spaced apart by a second predetermined distance illustrated by dimension 62. Preferably, dimension 60 is about 13 inches, and dimension 62 is about 6 inches. Therefore, blades 38 and 40 are aligned at a predetermined angles 63 and 64, respectively, relative to an axis of symmetry 67 of disk hiller 36 to form elevated ridge 42 as planter unit 10 moves. Preferably, angles 63 and 64 are about 30°. The spacing and angulation of double disk blades 38 and 40 may be changed based upon the characteristics of the ground being worked. As the amount of residue on the soil increases, the angles 63 and 64 decrease. As the amount of residue on the soil decreases, angles 63 and 64 increases. For most applications, distance 60 will range from about 8 inches to about 16 inches. Also for most applications, the distance 62 will range from about 4 inches to about 8 inches. Preferably, a trailing edge of each double disk hiller blade 38 and 40 is spaced apart from double disk openers 22 by a predetermined distance illustrated by dimension 65 in FIG. 5. Illustratively, dimension 65 has a range between about 0 to about 16 inches. Preferably, dimension 65 is about 6 inches.

It is understood that although disk blades 38 and 40 are preferably round, 13½ inch disk blades, that other types of disk blades or wheels may be used in accordance with the present invention. For instance, notched wheels or wheels containing a plurality of teeth may be used in place of disk blades 38 and 40. Any type of means configured to be coupled to the planter unit ahead of the planting apparatus for creating an elevated ridge 42 including a mixture of soil and/or residue directly in front of the planter unit and without any type of deep tillage can be used in accordance with the present invention.

Figure 3:
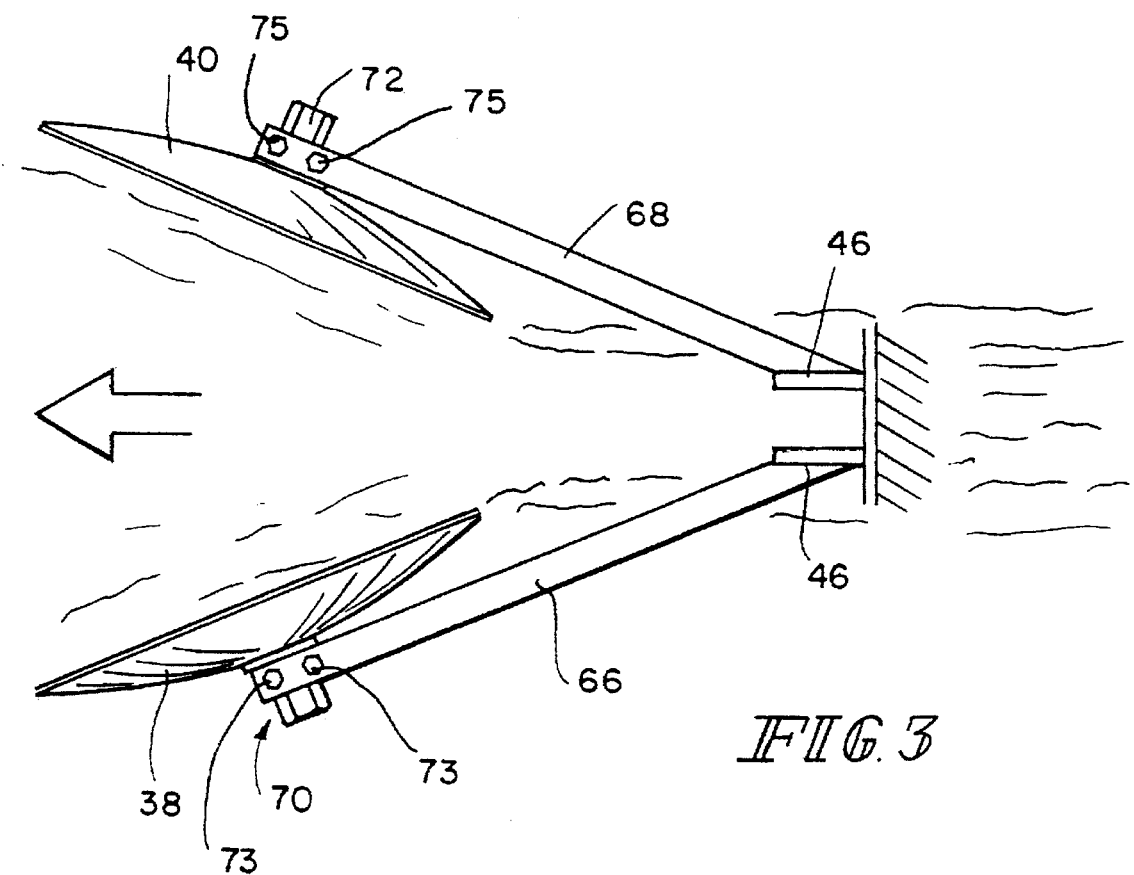
FIG. 3 is a top plan view of a second embodiment of the double disk hiller of the present invention.

Another embodiment of the double disk hiller is illustrated in FIG. 3. In FIG. 3, spaced apart disk blades 38 and 40 are coupled directly to planter row unit bracket 46 by angled frame members 66 and 68, respectively. Frame members 66 and 68 are illustratively welded or otherwise coupled to row unit bracket 46. Blades 38 and 40 are coupled to frame members 66 and 68, respectively, by spindle assemblies 70 and 72, respectively. The angle of blades 38 and 40 are adjustable using fasteners 73 and 75, respectively, in a conventional manner.

Figure 4:
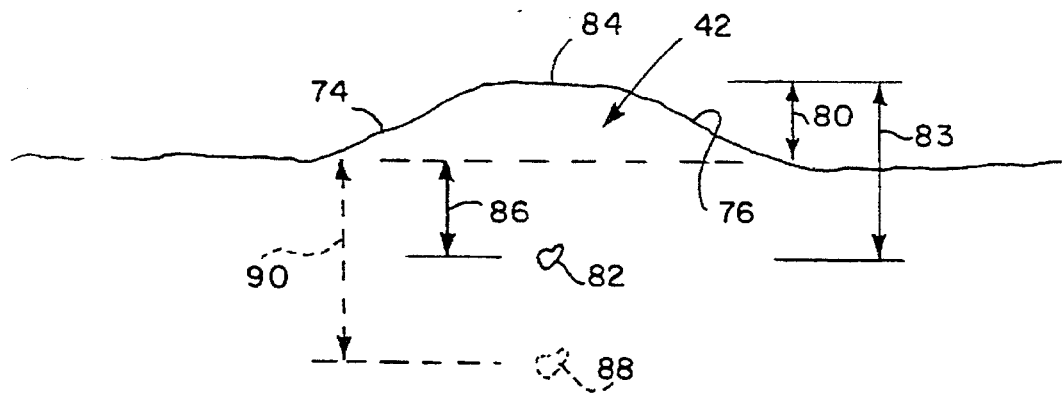
FIG. 4 is a diagrammatical view illustrating a raised or elevated ridge profile formed by the double disk hiller and the location of a seed planted by the planter unit into the raised ridge profile.

FIG. 4 is a diagrammatical view illustrating the planting results of the no-till planting apparatus and method of the present invention. Double disk hiller 36 located in front of each planter unit creates elevated ridge 42 having opposite side surfaces 74 and 76. Elevated ridge 42 is located above the normal soil surface level 78 as illustrated by dimension 80 in FIG. 4. Dimension 80 is preferably about 1 inch to about 1½ inches. A seed 82 is planted by planter unit 10 at a depth of about 1 inch to about 2½ inches below top surface 84 of elevated ridge 42 as illustrated by dimension 83. Disk hiller 36 causes soil to strike blades 24 and 26 of double disk opener 22 as planter unit 10 moves in the direction of arrow 16 so that gauge wheels 28 and 30 ride on elevated ridge 42. Therefore, because planter unit 10 rides on elevated ridge 42, seed 82 is planted about ¾ inch to about 1 inch below the normal soil surface level 78 as illustrated by dimension 86. Therefore, seed 82 is located about 1 inch to 1½ inches higher than a normal seed location which is illustrated by dotted lines 88. Conventional seed 88 is therefore located about 1¾ inches to about 2½ inches below the normal surface level 78 as illustrated by dimension 90. Gauge wheels 28 and 30 and press wheels 32 and 34 compress or firm the soil in elevated ridge 42 slightly as illustrated in FIG. 1.

Advantageously, the apparatus and method of the present invention plants seeds in a raised or elevated seed profile level without using any primary deep tillage. In contrast to U.S. Pat. No. 4,762,181 to Cox discussed above, the improved apparatus of the present invention does not use any primary or secondary tillage. This reduces the amount of fuel and labor cost as much as 60%–70%, as compared to conventional deep tillage instruments. Therefore, wear and tear on the equipment will also be reduced. The apparatus of the present invention also includes no secondary tillage. The apparatus of the present invention advantageously cuts the soil only to a depth less than the depth of double disk opener 22.

Advantageously, the seeds planted in raised profile location 82 are typically 6° F.–8° F. warmer than seeds planted at the normal depth illustrated by location 88. In addition, elevated ridge 42 tends to keep seeds 82 moist, but not excessive moisture. Rain water moves down sides 74 and 76 of elevated ridge 42 and soaks into elevated ridge 42. Rain water collects in the area between adjacent elevated ridges 42 and therefore does not wash away seeds 82 planted in the elevated ridge 42.

Figure 5:
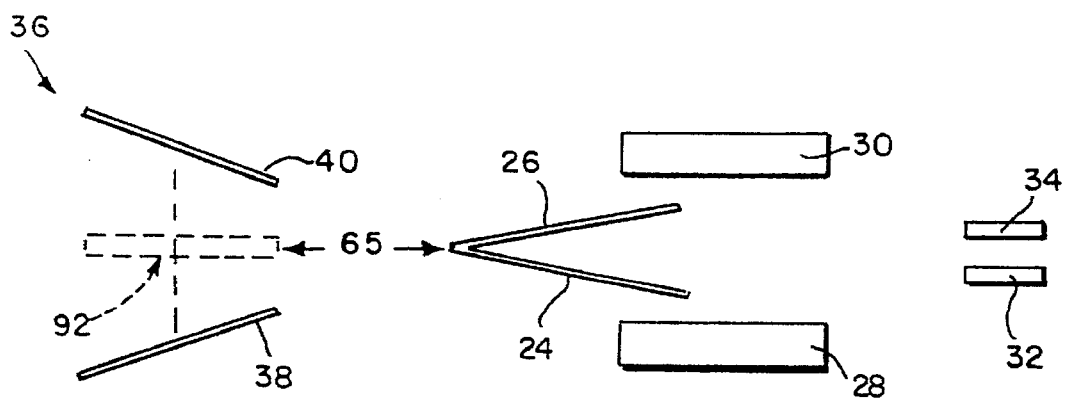
FIG. 5 is a diagrammatical plan view illustrating the angular and spacial relationships of the components of the planter unit, the disk hiller apparatus, and an optional coulter of the present invention.

If desired, an optional coulter illustrated by dotted lines 92 in FIG. 5 may be added between blades 38 and 40 of double disk hiller 36. Coulter 92 is coupled to planter unit 10 or to double disk hiller assembly 36 in a conventional manner. The coulter is set to cut soil at a depth of about 2 inches to about 2¼ inches below top surface 78. Therefore, the depth of the coulter is less than the depth of double disk openers 22 which are typically set at about 2½ inches below top surface 78. It is understood that more than one coulter can be used if desired.

In certain instances, such as in heavy residue situations, disk hiller 36 may be used in conjunction with a row cleaner such as disclosed in the Martin patent discussed above. Any toothed, finger-type, or other apparatus that moves crop residue may be used in front of disk hiller 36. One or more wheeled units can be used to move the residue. The row cleaner may also be used with the optional coulter. The disk hiller is coupled between the row cleaner and the planter unit.

In other instances, a single angled blade may be used to form the elevated ridge 42. Disk size or shape of the disk hiller is not a limiting factor of the present invention. Any apparatus coupled directly to the planter unit for forming an elevated ridge 42 may be used in accordance with the present invention.

Figure 6:
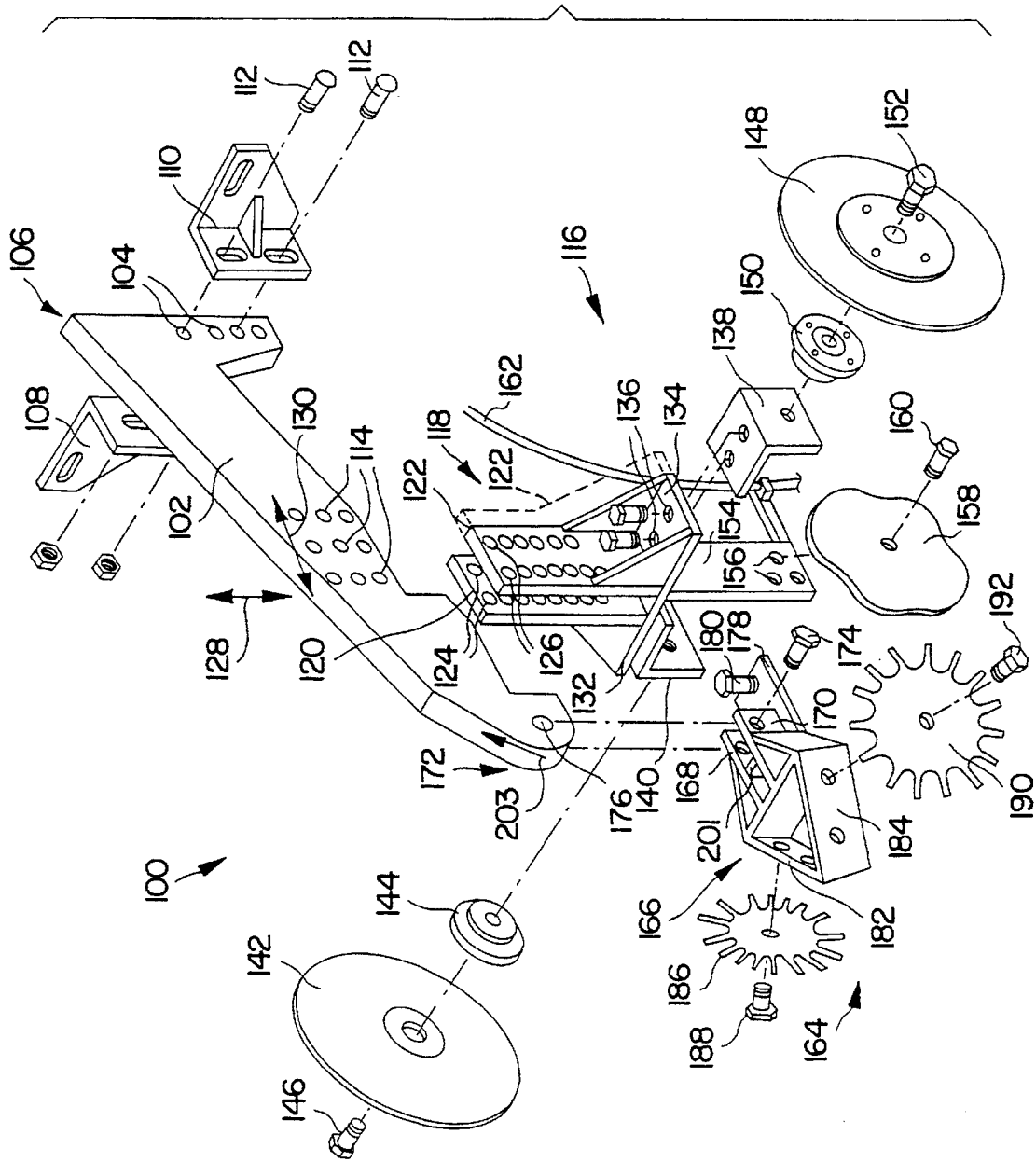
FIG. 6 is an exploded perspective view of a second embodiment of the present invention in which a disk hiller is rigidly coupled to a support extending in front of a planter unit, a row cleaning implement is pivotably coupled to the support, and a fertilizer disk is coupled to the support between the disk blades of the hilling device.
Figure 7:
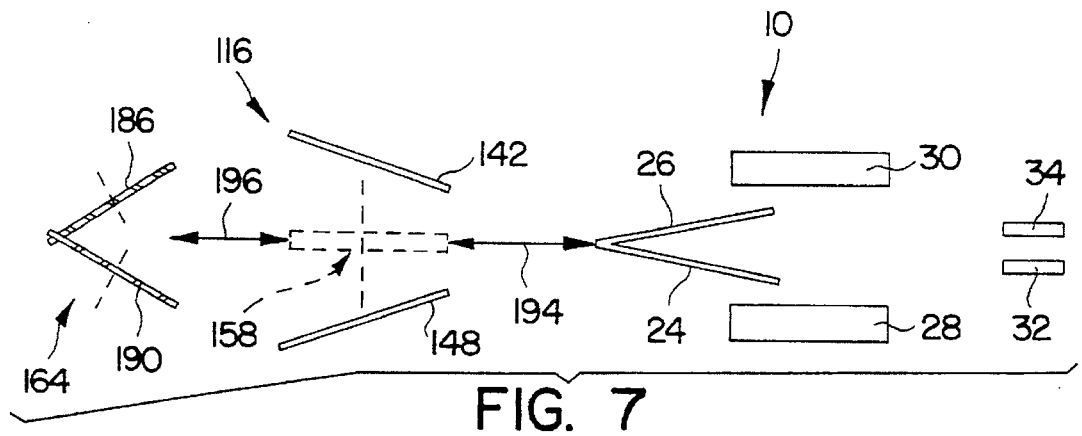
FIG. 7 is a diagrammatical plan view illustrating the angular and spacial relationships of the components of the planter unit, the disk hiller, the fertilizer disk, and the row cleaning implement.
Figure 8:
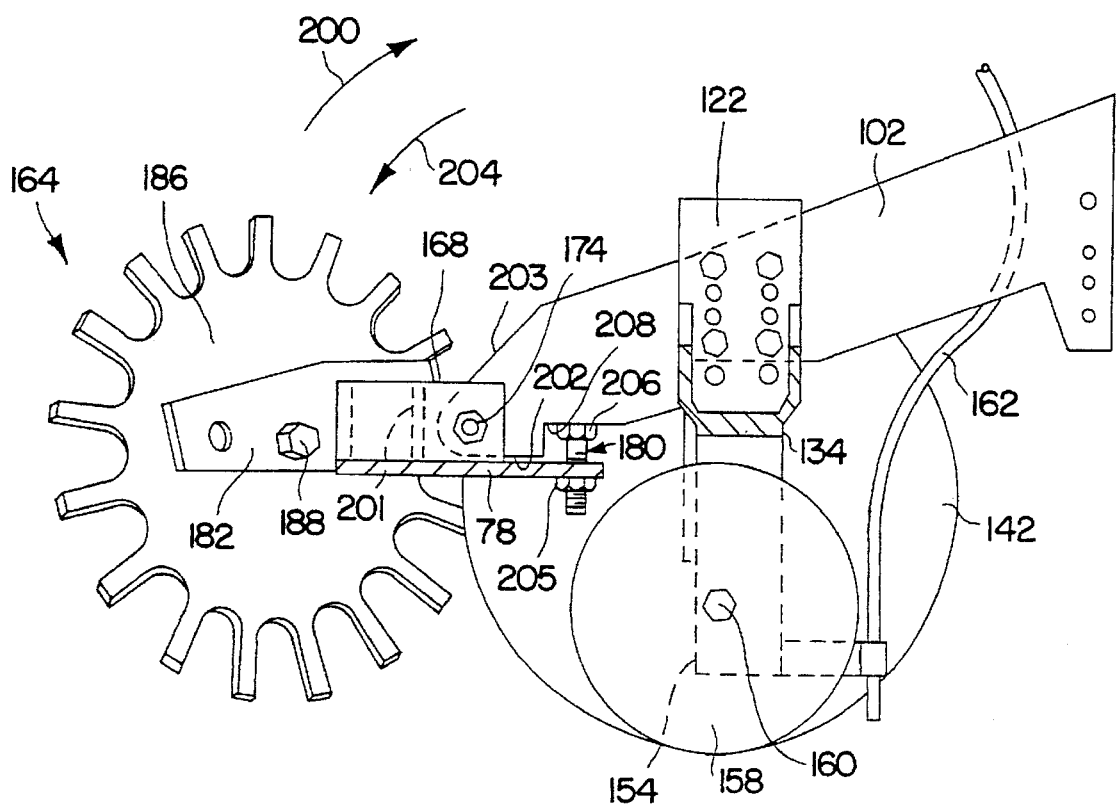
FIG. 8 is a sectional view taken through the no-till planting apparatus of FIG. 6.

Another embodiment of the present invention is illustrated in FIGS. 6-8. The no-till farming apparatus 100 includes an elongated support 102 having a plurality of mounting holes 104 adjacent a first end 106. A pair of mounting brackets 108 and 110 are provided for coupling support 102 to the planter unit 10. The location of the support 102 relative to the planter unit 10 is adjustable by positioning fasteners 112 into selected apertures 104.

Support 102 is also formed to include an array of mounting apertures 114. This array of mounting apertures 114 is used to couple a hilling device 116 to support 102. Hilling device 116 includes a mounting bracket 118 having a pair of elongated plates 120 and 122. Plates 120 and 122 are spaced apart so that support 102 slides between plates 120 and 122. Plates 120 and 122 are formed to include spaced apart pairs of apertures 124 and 126, respectively. The apertures 124 and 126 permit the location of disk hiller 116 to be adjusted both vertically in the direction of double headed arrow 128 and horizontally in the direction of double headed arrow 130. Mounting bracket 118 further includes a pair of horizontal mounting portions 132 and 134. Mounting portion 134 is formed to include apertures 136 for coupling mounting portion 134 to disk bracket 138. Disk bracket 140 is coupled to mounting bracket 132 in a similar manner. A first disk blade 142 and first hub 144 are coupled to disk bracket 140 with a suitable fastener 146. A second disk blade 148 and second hub 150 are coupled to disk bracket 138 with a suitable fastener 152. Although two disk blades 142 and 148 are illustrated in FIG. 6, it is understood that a single disk blade 142 or 148 may be provided for forming the elevated ridge of the present invention. Blades 142 and 148 may be concave disks, notched disks, flat disks, or any other type disk. In addition, any other apparatus capable of loosening the soil and hilling it up to form an elevated ridge adjacent the planter may be provided in accordance with the present invention.

Mounting bracket 118 includes an extension portion 154 having a plurality of apertures 156. A fertilizer disk 158 is rotatably coupled to a selected aperture 156 of extension portion 154 with a suitable fastener 160. Illustratively, fertilizer wheel 158 is a 2968 Series Fertilizer Wheel available from Yetter Manufacturing Company located in Colchester, Ill. A tube 162 is coupled adjacent fertilizer wheel 158 to supply fertilizer. It is understood that any type of fertilizer wheel and mounting assembly can be used in place of fertilizer wheel 158. Either liquid or dry fertilizer may be used. Preferably, the position of fertilizer disk 158 is adjusted so that fertilizer is applied two inches to the side of the deposited seeds and two inches below the depth of the deposited seeds. The optimum placement is therefore 30° below the deposited seeds to stimulate early season seed growth.

A row cleaning implement 164 is pivotably coupled to support 102 ahead of hiller device 116. Such pivotable coupling permits movement of the row cleaning implement 164 relative to the support 102 as to the row cleaning implement 164 moves over the soil. In the illustrated embodiment, row cleaning implement 164 includes a mounting bracket 166 having spaced apart parallel plates 168 and 170 for receiving a second end 172 of support 102 therebetween. A suitable fastener 174 extends through apertures formed in plates 168 and 170 and through an aperture 176 formed in second end 172 of support 102 to pivotably couple mounting bracket 166 to support 102. Mounting bracket 166 also includes a bottom support 178 having an adjustable set screw 180 adjustably coupled thereto. Set bolt 180 provides a damper to limit pivotable movement of mounting bracket 66 relative to support 102. Mounting bracket 166 also includes a pair of angled plates 182 and 184. A first rotating wheel 186 is rotatably coupled to mounting plate 182 by fastener 188. A second rotatable wheel 190 is coupled to mounting plate 184 by suitable fastener 192. Wheels 186 and 190 include hubs (not shown) to facilitate rotation of wheels 186 and 190.

Although rotating wheels 186 and 190 are illustrated with a plurality of teeth, it is understood that any type of row cleaning implement can be used in accordance with the present invention. For instance, blades, brushes, tines, or wheels of any type may be used to move a portion of the residue from the row in front of the planter unit 10. It is also understood that a single rotating wheel, brush, or disk can be used to at least partially clear the residue from the row.

As illustrated in FIG. 7, hiller device 116 is preferably spaced ahead of the disk openers 24 and 26 of the planter unit 10 by a distance illustrated by dimension 194. Illustratively, dimension 194 has a range between about 0 to about 16 inches. Preferably, dimension 194 is about 6 inches. Row cleaning implement 164 is spaced apart from disk hiller 116 by a distance illustrated by dimension 196. Illustratively, dimension 196 has a range between about 0 to about 12 inches. Preferably, dimension 196 is about 4 inches.

FIG. 8 further illustrates the pivotable connection between row cleaning implement 164 and support 102. Advantageously, row cleaning implement 164 can pivot upwardly relative to support 102 in the direction of arrow 200. This upward pivotable movement is limited by engagement of a blocking plate 201 with angled face 203 of support 102. Engagement of plate 178 with bottom surface 202 of support 102 prevents pivotable movement of row cleaning implement 164 in the direction of arrow 204 beyond the position illustrated in FIG. 8. Nut 205 is rigidly coupled to plate 78 when set bolt 180 is adjusted downwardly so that head 206 abuts plate 78, full pivotable motion in the direction of arrow 200 is provided for row cleaning implement 164. When set bolt 180 is adjusted to a fully extended position in which row cleaning implement 164 is pivoted upwardly until blocking plate 201 engages surface 203 of support 102, a head 206 of set bolt 180 engages surface 208 of support 102 to hold row cleaning implement 168 rigidly in its fully upwardly pivoted position. Set bolt 180 can be adjusted between these two limit positions to provide a damper for limiting pivotable movement of the row cleaning implement 164 relative to support 102 to any desired amount.

Figure 9:
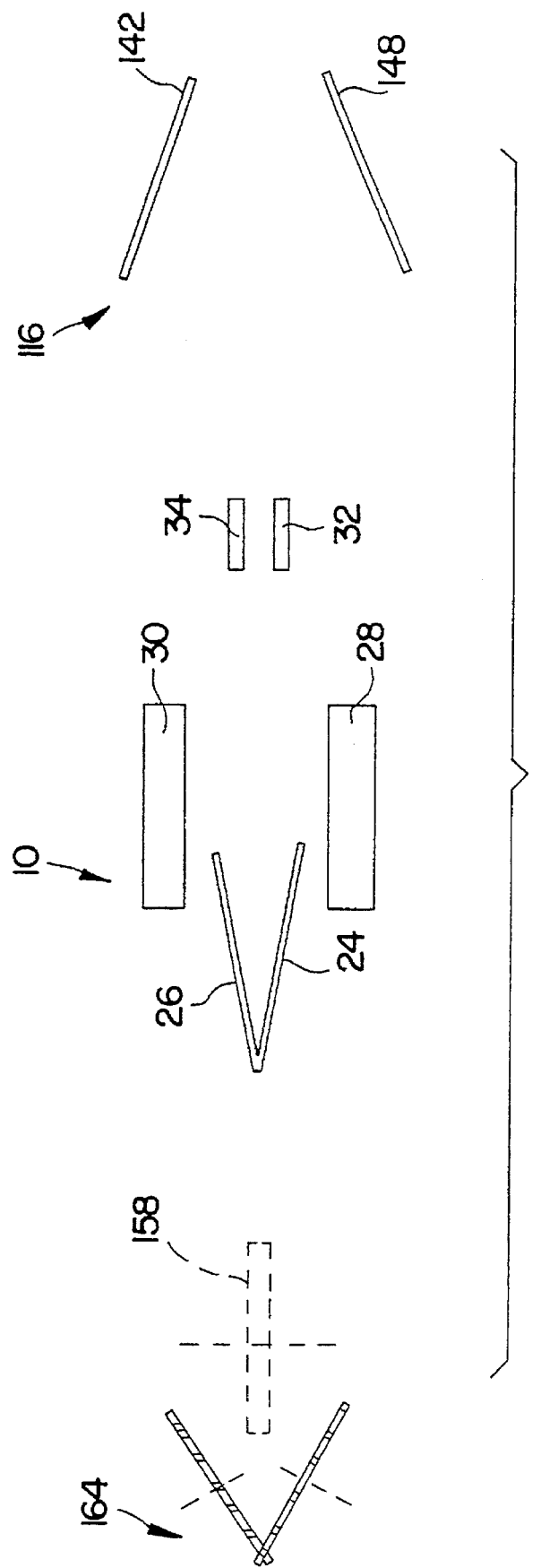
FIG. 9 is a diagrammatical plan view illustrating the angular and spacial relationships of the components of the planter unit, a disk hiller mounted behind the planter unit, and the row cleaning implement and fertilizer disk mounted ahead of the planter unit.

Another embodiment of the present invention is illustrated in FIG. 9. In this embodiment, the row cleaning implement 164 is pivotably coupled in front of planter unit 10 adjacent fertilizer disk 158. Hiller device 116 is then coupled to planter unit 10 so that the elevated ridge 42 is formed after the seed is deposited in disk openers 22. Hiller device 116 can be coupled to planter unit 10 using a mounting apparatus similar to FIGS. 1 and 2 or similar to FIGS. 6 and 8, or with any suitable coupling arrangement. In the FIG. 9 embodiment, the planter unit 10 is adjusted to plant the seeds more shallow than conventionally planted. The planter unit 10 is set to plant the seeds below a top surface of the soil a distance illustrated by dimension 86 and FIG. 4. Illustratively, dimension 86 is about ¾ inch to about 1 inch below normal soil top surface 78. Hiller device 116 behind planter unit 10 then forms the elevated ridge 84 having a dimension 80 of about 1 inch to about 1½ inches above the top surface 78. Therefore, the same seeding depth within the elevated ridge 42 is provided when hiller device 116 is mounted after the seed is deposited in disk openers 22.

Although the invention has been described in detail with reference to a certain preferred embodiment, variations and modifications exist within the scope and spirit of the invention as described and defined in the following claims.

What is claimed is:

1. A no-till farming apparatus for use with a planter unit which plants seeds as the planter unit is pulled along a predetermined path, the planter unit including a disk opener for cutting a furrow in the ground at a predetermined depth, a seed delivery tube to deposit seeds in the furrow, and at least one gauge wheel, the apparatus comprising:

a hiller device coupled to the planter unit, the hiller device being configured to form an elevated ridge including a mixture of soil and a residue remaining from a previous crop in front of the planter unit, the at least one gauge wheel riding on the elevated ridge formed by the hiller device so that the planter unit plants seeds a predetermined distance below a top surface of the elevated ridge formed by the hiller device to provide a raised profile seeding depth for the planted seeds relative to a top surface of the soil; and a residue cleaning implement coupled to the hiller device, the residue cleaning implement being located in front of the hiller device to clear at least a portion of the residue in front of the hiller device.

2. The apparatus of claim 1, wherein the hiller device includes a first blade and a second blade spaced apart from the first blade, the first and second blades being aligned at an angle relative to each other to form the elevated ridge.

3. The apparatus of claim 2, wherein a leading edge of the first blade is spaced apart from a leading edge of the second blade by a distance ranging from about 8 inches to about 16 inches, and a trailing edge of the first blade is spaced apart from a trailing edge of the second blade by a distance ranging from about 4 inches to about 8 inches.

4. The apparatus of claim 2, wherein a leading edge of the first blade is spaced apart from a leading edge of the second blade by a distance of about 13 inches, and a trailing edge of the first blade is spaced apart from a trailing edge of the second blade by a distance of about 6 inches.

5. The apparatus of claim 2, wherein the first and second blades of the hiller device are aligned at about a 30° angle relative to an axis of symmetry of the hiller device.

6. The apparatus of claim 2, further comprising a fertilizer disk coupled to the hiller device.

7. The apparatus of claim 1, wherein a trailing edge of the hiller device is positioned about 0 to about 16 inches ahead of the planter unit.

8. The apparatus of claim 1, wherein the trailing edge of the hiller device is spaced apart from the planter unit by about 6 inches.

9. The apparatus of claim 1, wherein the hiller device includes at least one blade, the at least one blade of the hiller device cutting into the top surface of the soil only to a depth less than said predetermined depth of the disk opener of the planter unit.

10. The apparatus of claim 1, wherein the top surface of elevated ridge formed by the hiller device is located about 1 inch to about 1-½ inches above a top surface of the soil to provide a raised profile seeding depth for seeds planted by the planter unit relative to the top surface of the soil.

11. The apparatus of claim 1, wherein the residue cleaning implement is pivotably coupled to a support which extends in front of the hiller device.

12. The apparatus of claim 11, further comprising a damper coupled to the residue cleaning implement to limit pivotable movement of the residue cleaning implement relative to the support.

13. The apparatus of claim 1, wherein the residue cleaning implement includes at least one rotating wheel.

14. The apparatus of claim 1, wherein the residue cleaning implement includes at least one rotating brush.

15. The apparatus of claim 1, further comprising means for adjusting the location of the hiller device relative to the planter unit.

16. A no-till farming apparatus for use with a planter unit which plants seeds as the planter unit is pulled along a predetermined path, the apparatus comprising:

a support rigidly coupled to the planter unit and extending ahead of the planter unit;

a residue cleaning implement pivotably coupled to the support to clear at least a portion of a residue remaining from a previous crop in front of the planter unit; and a damper configured to limit pivotable movement of the residue cleaning implement relative to the support in a downward direction, the damper being located adjacent a bottom surface of the support to permit unrestricted pivotable movement of the residue cleaning implement relative to the support in an upward direction to minimize soil disturbance by the residue cleaning implement.

17. The apparatus of claim 16, wherein the damper is coupled to the residue cleaning implement to limit pivotable movement of the residue cleaning implement relative to the support.

18. The apparatus of claim 16, wherein the residue cleaning implement includes at least one wheel rotatably coupled to a mounting bracket, the mounting bracket being pivotably coupled to the support.

19. The apparatus of claim 16, wherein the residue cleaning implement includes at least one brush rotatably coupled to a mounting bracket, the mounting bracket being pivotably coupled to the support.

20. The apparatus of claim 16, further comprising a hiller device coupled to the support, the hiller device being located between the residue cleaning implement and the planter unit to form an elevated ridge including a mixture of soil and residue in front of the planter unit so that the planter unit plants seeds a predetermined distance below a top surface of the elevated ridge formed by the hiller device.

21. The apparatus of claim 20, wherein the hiller device includes a first blade and a second blade spaced apart from the first blade, the first and second blades being aligned at an angle relative to each other to form the elevated ridge.

22. A no-till farming apparatus for use with a planter unit which plants seeds as the planter unit is pulled along a predetermined path the apparatus comprising:

a support rigidly coupled to the planter unit and extending ahead of the planter unit;

a residue cleaning implement pivotably coupled to the support to clear at least a portion of a residue remaining from a previous crop in front of the planter unit;

a damper configured to limit pivotable movement of the residue cleaning implement relative to the support in a downward direction to minimize soil disturbance by the residue cleaning implement; and a hiller device coupled to the support, the hiller device being located between the residue cleaning implement and the planter unit to form an elevated ridge including a mixture of soil and residue in front of the planter unit so that the planter unit plants seeds a predetermined distance below a top surface of the elevated ridge formed by the hiller device, the planter unit including a disk opener for cutting a slot in the ground at a predetermined depth, a seed delivery tube to deposit seeds in the slot, and at least one gauge wheel, the at least one gauge wheel riding on the elevated ridge formed by the hiller device to provide a raised profile seeding depth for the planted seeds relative to a top surface of the soil.

23. The apparatus of claim 22, wherein the hiller device includes at least one blade, the at least one blade of the hiller device cutting into the top surface of the soil only to a depth less than said predetermined depth of the slot.

24. An improved no-till farming method for preparing soil covered with a residue remaining from a previous crop for planting seeds using a planter unit, the planter unit including a disk for cutting a furrow in the soil at a predetermined depth, the method comprising the steps of:

clearing at least a portion of the residue ahead of the planter unit;

forming an elevated ridge from the at least partially cleared soil by cutting below a top surface of the soil only to a depth less than said predetermined depth to mix soil and the residue in front of the planter unit; and planting seeds below a top surface of the elevated ridge to provide a raised profile seeding depth for the planted seeds relative to a top surface of the soil, the clearing, forming, and planting steps all occurring during a single pass of the planter unit over the soil.

25. The method of claim 24, further comprising the step of applying fertilizer in the elevated ridge during the single pass of the planter unit over the soil.

26. The method of claim 24, further comprising the step of applying fertilizer below the elevated ridge during the single pass of the planter unit over the soil.

* * * * *